US006485867B1

(12) United States Patent
Navarrete et al.

(10) Patent No.: US 6,485,867 B1
(45) Date of Patent: Nov. 26, 2002

(54) USE OF LIGNINS IN THERMOPLASTICS

(75) Inventors: Jaime Navarrete, Owensboro, KY (US); A. Jeff Chapman, Owensboro, KY (US); Chetan J. Parikh, Owensboro, KY (US); Roy T. Toomey, Hartford, KY (US)

(73) Assignee: Daramic, Inc., Burlington, MA (US)

( * ) Notice: Subject to any disclaimer, the term of this patent is extended or adjusted under 35 U.S.C. 154(b) by 0 days.

(21) Appl. No.: 09/702,598

(22) Filed: Oct. 31, 2000

Related U.S. Application Data

(63) Continuation-in-part of application No. 09/677,435, filed on Oct. 3, 2000, now abandoned.

(51) Int. Cl.[7] ............................................. H01M 2/16
(52) U.S. Cl. ...................................... 429/249; 429/255
(58) Field of Search ................................ 429/249, 254, 429/255

(56) References Cited

U.S. PATENT DOCUMENTS

| 3,351,495 A | * | 11/1967 | Larsen et al. .......... 210/500.36 |
| 3,907,726 A | * | 9/1975 | Tomiyama ........... 260/DIG. 43 |
| 5,665,488 A | * | 9/1997 | Young et al. ................ 429/143 |

FOREIGN PATENT DOCUMENTS

| JP | 07179654 A | * | 7/1995 | ............ C08K/3/10 |
| JP | 11121028 A | * | 4/1999 | .......... H01M/10/12 |

OTHER PUBLICATIONS

Irvin I. Rubin, "Handbook of Plastic Materials and Technology," John Wiley & Sons Inc. (New York, NY), p. 349–354, (1990).

Harvey L. Stein, "Ultrahigh Molecular Weight Polyethylenes (UHMWPE)," Engineered Materials Handbook, vol. 2 Engineering Plastics, ASM International (Metals Park, OH), p. 167–171, (1988).

Jurgen O. Besenhard (ED.), "Handbook of Battery Materials," Wiley–VCH (New YOrk, NY), p. 258–263 (1999).

H. Dietz, et al, "Influence of Substituted Benzaldehydes and Their Derivatives as Inhibitors for Hydrogen Evolution in Lead/Acid Batteries," Journal of Power Sources 53, Elsevier, p. 359–365, (1995).

C. Klason, et al, "Kraft Lignian as Filler for Polyolefins, "Plastic and Rubber Processing and Applications, vol. 6, No. 1, The Plastics and Rubber Institute (Great Britain), p. 17–20, (1986).

B. Kosikova, et al, "The Effect of Adding Lignin on Modification of Surface Properties of Polypropylene," Eur. Polym. J., vol. 31, No. 10, Elsevier, (Great Britain), p. 953–956, (1995).

Cornelia Vasile, et al, "Polyolefins/Lignosulfonates Blends," Cellulose Chemistry and Technology, 32, p. 61–87, (1998).

P. Alexy, et al, "The Effect of Blending Lignin with Polyethylene and Polypropylene on Physical Properties," Polymer 41, Elsevier, p. 4901–4908 (2000).

* cited by examiner

*Primary Examiner*—Carol Chaney
(74) *Attorney, Agent, or Firm*—Robert H. Hammer, III

(57) ABSTRACT

The instant invention is directed to the use of lignin in thermoplastics (such as: ultra-high molecular weight polyethylene (UHMWPE)). In the first aspect of the invention, lignins are added to a lead acid battery separator comprising a microporous membrane including an ultra-high molecular weight polyethylene, a filler, and a processing oil. In the second aspect of the invention, lignins are used as a processing aid in thermoplastics.

18 Claims, No Drawings

USE OF LIGNINS IN THERMOPLASTICS

RELATED APPLICATION

This application is a continuation-in-part of U.S. application Ser. No. 09/677,435 filed Oct. 3, 2000, and now abandoned.

FIELD OF THE INVENTION

This invention is directed to the use of lignins in thermoplastics (such as: ultra-high molecular weight polyethylene (UHMWPE)).

BACKGROUND OF THE INVENTION

Lignin is a by-product of wood pulping operations. Lignin's chemical structure is extremely complex. Lignin is generally accepted to be a three dimensional, crosslinked polymer comprised of three different phenyl propenol moieties. The relative amounts of the three monomeric compounds, coumaryl alcohol, coniferyl alcohol, and sinapyl alcohol, vary with the sources of the lignin. Grass lignins, such as obtained from rice, corn, or sugar cane, are comprised predominantly of coumaryl and coniferyl alcohols. Softwood lignins, such as obtained from spruce, pine, redwood, cedar, and the like, are made up of predominantly coniferyl alcohol alone. Hardwood lignins are comprised of mostly coniferyl and sinapyl alcohols. Hardwood lignins are obtained, or substantially obtained, from oak, cherry, maple, birch, sweet gum, mahogany, and the like.

A thermoplastic refers to a polymer that softens or melts when exposed to heat and returns to its original condition when cooled. Ultra-high molecular weight polyethylene (UHMWPE) refers to a polymer with molecular weight greater than 1 million and preferably in the range of about 5 million to about 7 million. UHMWPE has many unique properties, but it is extremely difficult to process, i.e., form into usable shapes. Conventional extrusion and molding techniques can not be used. When extrusion techniques are used, the energy added to the polymer by the extruder may cause chain scissions (e.g., thermal degradation) which, in turn, detrimentally effects the polymer. Rubin, I. I., Editor, *Handbook of Plastic Materials and Technology*, John Wiley & Sons, Inc., NYC, N.Y., (1990), p. 349–354, Stein, H. L., "Ultra High Molecular Weight Polyethylene (UHMWPE)", *Engineered Materials Handbook, Vol. 2 Engineering Plastics*, ASM International, Metals Park, Ohio, 1988, and U.S. Pat. No. 4,778,601, each is incorporated herein by reference. One method of extruding UHMWPE is to mix the UHMWPE resin with a mineral oil (or plasticizer), for example 80–98% by weight UHMWPE and 2–20% by weight mineral oil. The uniformly dispersed oil allows the UHMWPE to flow more easily through the extruder. See U.S. Pat. No. 4,778,601.

In the first aspect of the invention, lignins are added to an ultra-high molecular weight polyethylene battery separator for a lead acid battery for, in part, reducing antimony poisoning.

Poisoning of lead acid storage batteries is known. One poison is antimony (Sb) which is an alloying component of the lead used in the batteries. Antimony poisoning causes a reduction in hydrogen overvoltage. Several solutions to the antimony poisoning problem have been suggested. For example, see: U.S. Pat. No. 5,221,587—an uncrosslinked natural or synthetic rubber is a layer on or incorporated into microporous or glass fiber separators (also see column 2, line 51—column 3, line 14 for a discussion of additional solutions); U.S. Pat. No. 5,759,716—organic polymers having an affinity for the metal impurity (e.g., Sb) are incorporated into, for example, the separator; European Published Application No. EP 0 910 130 A1—thiolignins are incorporated into fibrous separators; and Japanese Published Application (Kokai) No. 11-191405—lignins are impregnated or coated on a glass mat separator.

In the second aspect of the invention, lignins are added to thermoplastic polymer formulations to act as a processing flow aid.

SUMMARY OF THE INVENTION

The instant invention is directed to the use of lignins in thermoplastics (such as: ultra-high molecular weight polyethylene (UHMWPE)). In the first aspect of the invention, lignins are added to a lead acid battery separator comprising a microporous membrane including an ultra-high molecular weight polyethylene, a filler, and a processing oil. In the second aspect of the invention, lignins are used as a processing aid in thermoplastics.

DETAILED DESCRIPTION OF THE INVENTION

In the first aspect of this invention, a lignin is added to a microporous battery separator for a lead acid battery made from ultra-high molecular weight polyethylene. The lignin acts as an antimony suppressor which reduces antimony poisoning within the battery. Battery separators made with ultra-high molecular weight polyethylene are known. See for example U.S. Pat. No. 3,351,495; and Besenhard, J. O., Editor, *Handbook of Battery Materials*, Wiley-VCH, NYC, N.Y. (1999) p. 258–263, both are incorporated herein by reference.

The lead acid battery separator generally comprises a microporous membrane made from UHMWPE, fillers, processing oil and lignin. The microporous membrane has an average pore size in the range of about 0.1 to about 1.0 micron, a porosity greater than 10% (preferably between about 55% and about 85%; and most preferably between about 55% and about 70%), and the pore structure is referred to as an open cell structure or interconnected pore structure. The membrane generally comprises about 15–25% by weight UHMWPE, 50–80% by weight filler, 0–25% by weight process oil, and 5–20% lignin. Additionally, minor amounts of processing aids may be added. Preferably, the membrane comprises 17–23% by weight UHMWPE, 50–60% filler, 10–20% processing oil, and 5–10% lignin. These materials are mixed and extruded in a known fashion. See, for example: U.S. Pat. No. 3,351,495; and Besenhard, J. O., Editor, *Handbook of Battery Materials*, Wiley-VCH, NYC, N.Y. (1999) p. 258–263, both are incorporated herein by reference.

UHMWPE refers to polyethylenes with a molecular weight greater than 1 million, preferably greater than 3 million. UHMWPE are commercially available from Ticona LLC, Bayport, Tex., and Montell, Inc., Wilmington, Del.

Filler refers to high surface area particles with an affinity for the processing oil. Preferred fillers include precipitated silica, oxide compounds, and mixtures thereof. Such silicas are commercially available from PPG, Pittsburgh, Pa. and Degussa-Huls AG, Frankfurt, Germany. Also see U.S. Pat. Nos. 3,351,495 and 4,861,644, incorporated herein by reference, for additional filler suggestions.

Processing oil (or plasticizer) refers to, for example, mineral oil, olefinic oil, parafinic oil, naphthenic oil, aromatic oil, and mixtures thereof. Processing oil performs two functions; first, it improves the processability of UHMWPE, and second, it is the extractable component, which is used to create the microporous structure of separator. Mineral oil is preferred and is commercially available from Equilon of Houston, Tex. Also see U.S. Pat. Nos. 3,351,495 and 4,861,644, incorporated herein by reference, for additional processing oil (or plasticizer) suggestions.

Lignin refers to those by-products of wood pulping operations having extremely complex chemical structures that consist primarily of phenyl propane linked together in three dimensions. Lignins include softwood lignins, hardwood ligins, and mixtures thereof. Oak or maple flour may also be used, but because the lignins have not been separated from the cellulose fibers, they are more difficult to process. Hardwood lignins are preferred. Such lignins are commercially available from Westvaco Corp., Charleston, S.C. under the product name of PC-1369.

Further explanation of this aspect of the invention will be set out in the examples below.

In the second aspect of the instant invention, a ligin may be added to a thermoplastic polymer as a processing aid (e.g., flow lubricant).

In general, it has been found that when up to 10% by weight of the lignin is added to the thermoplastic polymer or the thermoplastic polymer formulation that beneficial results are obtained. Those results include decreased process temperature and polymer viscosity, and increased strength of end product. While not wishing to be bound by the following, it is believed that the lignin is able to reduce thermal degradation (chain scission) of the polymer during processing.

A thermoplastic polymer formulation preferably refers to a mixture of thermoplastic polymer, processing oil (or plasticizer), and lignin. In general, the formulation may 60–80% thermoplastic polymer, up to 20% processing oil, and up to 10% lignin. Preferably, the formulation may be about 70–80% thermoplastic polymer, 15–20% processing oil, and 5–10% lignin.

A thermoplastic polymer refers to a polymer that softens or melts when exposed to heat and returns to its original condition when cooled. Natural substances that exhibit this behavior are crude rubber and a number of waxes; however, the term is usually applied to synthetics such as polyvinyl chloride, nylons, fluoropolymers, polyethylene (including ultrahigh molecular weight polyethylene), polystyrene, polypropylene, acrylic resins, other macromolecules, and combinations thereof Preferably, the thermoplastic polymer is a polyolefin. Most preferably, the thermoplastic polymer is ultrahigh molecular weight polyethylene (UHMWPE). The thermoplastic polymer may also be a mixture of the polymer and a filler. The filler is as discussed above. The ratio of filler to product is about 1.2:1 to about 5:1, preferably about 2.8:1.

Processing oil (or plasticizer) refers to, for example mineral oil, olefinic oil, parafinic oil, naphthenic oil, aromatic oil, and mixtures thereof. Also see U.S. Pat. Nos. 3,351,495 and 4,861,644, incorporated herein by reference, for additional processing oil (or plasticizer) suggestions.

Lignin refers to those by-products of wood pulping operations having extremely complex chemical structures that consist primarily of phenyl propane linked together in three dimensions. Lignins include softwood lignins, hardwood lignins, and mixtures thereof. Hardwood lignins are preferred. Such lignins are commercially available from Westvaco Corp., Charleston, S.C. under the product name of PC-1369.

Further explanation of this aspect of the invention will be set out in the examples below.

EXAMPLES

The formulations set out in Table 1 were prepared.

TABLE 1

| | (% By Weight) | | | | |
|---|---|---|---|---|---|
| Sample | Polymer (UHMWPE) | Filler (Silica) | Oil (Mineral Oil) | Minor Ingredients | Lignin |
| 1 | 22.1 | 57.9 | 17.2 | 2.8 | 0 |
| 2 | 22.0 | 57.1 | 17.1 | 2.8 | 1 (Hardwood) |
| 3 | 20.9 | 54.3 | 17.0 | 2.8 | 5 (Hardwood) |
| 4 | 20.3 | 52.9 | 17.0 | 2.8 | 7 (Hardwood) |
| 5 | 20.2 | 52.5 | 17.0 | 2.8 | 7.5 (Hardwood) |
| 6 | 19.5 | 50.6 | 17.0 | 2.9 | 10.0 (Hardwood) |
| 7 | 20.2 | 52.5 | 17.0 | 2.8 | 7.5 (Softwood) |
| 8 | 19.5 | 50.6 | 17.0 | 2.9 | 10.0 (Softwood) |
| 9 | 16.9 | 43.3 | 17.0 | 2.8 | 20.0 (Softwood) |
| 10 | 20.9 | 54.3 | 17.0 | 2.8 | 5.0 (Oakwood flour) |
| 11 | 19.5 | 50.6 | 17.0 | 2.9 | 10.0 (Oakwood flour) |
| 12 | 20.9 | 54.3 | 17.0 | 2.8 | 5.0 (Maplewood flour) |
| 13 | 20.2 | 52.5 | 17.0 | 2.8 | 7.5 (Maplewood flour) |
| 14 | 19.5 | 50.6 | 17.0 | 2.9 | 10.0 (Maplewood flour) |
| 15 | 16.9 | 43.3 | 17.0 | 2.8 | 20.0 (Maplewood flour) |

The formulations of Table 1 set out in Table 2 were tested for Sb suppression. Results below were obtained via a cyclic voltammetry technique. Cyclic voltammetry techniques are known. Dietz, H., et al, "Influence of substituted benzaldehydes and their derivatives as inhibitors for hydrogen evolution in lead/acid batteries," 53 Journal of Power Sources 359–365 ( 995), incorporated herein by reference.

TABLE 2

| Sample | Sb Peak Height (mA) | Current (mA) at start of sweep @ −1.100 V |
|---|---|---|
| Control (15 ppm Sb) | 2.8 | 1.9 |
| 3 | 0.1 | 0.0 |
| 5 | 0.0 | 0.1 |
| 6 | 0.1 | 0.0 |

TABLE 2-continued

| Sample | Sb Peak Height (mA) | Current (mA) at start of sweep @ −1.100 V |
|---|---|---|
| 7 | 0.1 | 0.1 |
| 8 | 0.1 | 0.1 |
| 9 | 0.1 | 0.1 |
| 10 | 0.3 | 0.1 |
| 11 | 0.1 | 0.0 |
| 12 | 0.0 | 0.1 |
| 13 | 0.0 | 0.1 |
| 14 | 0.0 | 0.1 |
| 15 | 0.0 | 0.1 |

The formulations of Table 1 set out in Table 3 were tested for viscosity reduction. Formulations were tested using Kayeness Rheometer Galaxy III Model 9052, available from Kayeness, Inc. of Morgantown, Pa.

TABLE 3

| Sample | 1 | 2 | 3 | 4 |
|---|---|---|---|---|
| Shear rate (1/sec) | | Shear Viscosity (Pa-sec) | | |
| 1368 | 1.94E+02 | 1.76E+02 | 1.58E+02 | 1.54E+02 |
| 547 | 4.32E+02 | 3.93E+02 | 3.52E+02 | 3.41E+02 |
| 164 | 1.01E+03 | 8.97E+02 | 8.68E+02 | 8.44E+02 |
| 55 | 2.01E+03 | 1.96E+03 | 1.92E+03 | 1.80E+02 |
| 16 | 4.83E+03 | 4.51E+03 | 4.77E+03 | 4.59E+03 |
| 6 | 1.23E+04 | 1.18E+04 | 1.19E+04 | 1.14E+03 |
| 2 | 2.27E+04 | 2.21E+04 | 1.93E+04 | 2.30E+04 |
| 1 | 9.88E+04 | 8.57E+04 | 8.32E+04 | 9.40E+04 |

The present invention may be embodied in other specific forms without departing from the spirit or essential attributes thereof and, accordingly, reference should be made to the appended claims, rather than the foregoing specification, indicating the scope of the invention.

What is claimed is:

1. A battery separator for lead acid batteries comprising:
    a microporous membrane including
        an ultra high molecular weight polyethylene,
        a filler,
        a processing oil, and
        a hardwood lignin source.
2. The separator of claim 1 wherein said hardwood lignin source being selected from the group consisting of hardwood lignins, hardwood flours, and mixtures thereof.
3. The separator of claim 1 wherein said hardwood lignin source comprises about 5–20% by weight of said membrane.
4. The separator of claim 2 wherein said hardwood lignin source comprises a hardwood lignin.
5. The separator of claim 3 wherein said hardwood lignin source comprises about 5–10% by weight of said membrane.
6. A lead acid battery including the separator of claim 1.
7. A battery separator for a lead acid battery comprises:
    a microporous membrane having an open cell structure with pores sizes in the range of about 0.1 to about 1 micron and porosity greater than 10%, and further comprising
        about 15–25% by weight of said separator being an ultra high molecular weight polyethylene;
        about 50–80% by weight of said separator being a filler;
        less than about 25% by weight of the separator being a processing oil;
        about 5–20% by weight of the separator being a hardwood lignin source.
8. The separator of claim 7 wherein said hardwood lignin source being a hardwood lignin.
9. The separator of claim 7 wherein said filler being selected from the group consisting of precipitated silica, oxide compounds, and mixtures thereof.
10. The separated of claim 7 wherein said oil being selected from the group consisting of mineral, olefinic oil, parafinic oil, napthenic oil, aromatic oil, and mixtures thereof.
11. A thermoplastic polymer formulation comprising:
    up to about 80% by weight of the formulation being an ultra high molecular weight polyethylene;
    up to about 20% by weight of the formulation being a processing oil, and
    up to about 10% by weight of the formulation being a hardwood lignin source.
12. The formulation of claim 11 wherein said hardwood lignin source being a hardwood lignin.
13. The formulation of claim 11 wherein said polymer being an ultrahigh molecular weight polyethylene.
14. A method for improving the flow processing of ultra high molecular weight polyethylene comprising the step of:
    adding a hardwood lignin source to a ultra high molecular weight polyethylene prior to the processing.
15. The method according to claim 14 wherein up to 10% by weight of said hardwood lignin source being added.
16. The method according to claim 14 wherein the hardwood lignin source being added to a blend of ultra high molecular weight polyethylene and processing oil.
17. The method according to claim 14 wherein the polymer being a polyolefin.
18. The method according to claim 14 wherein the hardwood lignin source being a hardwood lignin.

* * * * *